US008649530B2

(12) United States Patent
Kim et al.

(10) Patent No.: US 8,649,530 B2
(45) Date of Patent: Feb. 11, 2014

(54) METHOD AND APPARATUS FOR CANCELING NON-UNIFORM RADIATION PATTERNS IN ARRAY SPEAKER SYSTEM

(75) Inventors: Young-tae Kim, Seongnam-si (KR); Jung-ho Kim, Yongin-si (KR); Seng-chul Ko, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1720 days.

(21) Appl. No.: 12/076,434

(22) Filed: Mar. 18, 2008

(65) Prior Publication Data

US 2009/0097668 A1 Apr. 16, 2009

(30) Foreign Application Priority Data

Oct. 12, 2007 (KR) ........................ 10-2007-0103165

(51) Int. Cl.
*H04B 15/00* (2006.01)

(52) U.S. Cl.
USPC .......... 381/94.1; 381/71.1; 381/71.2; 381/56; 381/59

(58) Field of Classification Search
None
See application file for complete search history.

(56) References Cited

U.S. PATENT DOCUMENTS

| | | | | |
|---|---|---|---|---|
| 6,795,557 | B1 * | 9/2004 | Makivirta et al. | 381/66 |
| 2004/0151325 | A1 | 8/2004 | Hooley et al. | |
| 2005/0041530 | A1 | 2/2005 | Goudie | |
| 2006/0204022 | A1 | 9/2006 | Hooley et al. | |
| 2008/0285771 | A1 * | 11/2008 | Tanaka et al. | 381/92 |

FOREIGN PATENT DOCUMENTS

WO WO 2007052726 A1 * 5/2007

* cited by examiner

*Primary Examiner* — Benjamin Sandvik
*Assistant Examiner* — Leslie Pilar Cruz
(74) *Attorney, Agent, or Firm* — Staas & Halsey LLP

(57) ABSTRACT

An array speaker system canceling non-uniform radiation patterns and a method for implementing the same are provided. The method for canceling non-uniform radiation patterns includes predicting radiation patterns in an array speaker with respect to input signals, generating cancellation signals with respect to at least one region corresponding to non-uniform radiation patterns of the predicted radiation patterns, synthesizing the input signals and the cancellation signals, and outputting the synthesized signals to the array speaker. Sound signals from which non-uniform radiation patterns having distorted sound are cancelled such that a stable sound field having uniform radiation characteristics may be obtained and provided to a listener.

20 Claims, 7 Drawing Sheets u(z) : INPUT SIGNALS
d(z) : TARGET SIGNALS
w(z) : REPRODUCED SIGNALS
e(z) : ERROR SIGNALS

METHOD AND APPARATUS FOR CANCELING NON-UNIFORM RADIATION PATTERNS IN ARRAY SPEAKER SYSTEM

CROSS-REFERENCE TO RELATED APPLICATIONS

This application claims the benefit of Korean Patent Application No. 10-2007-0103165, filed on Oct. 12, 2007, in the Korean Intellectual Property Office, the disclosure of which is incorporated herein in its entirety by reference.

BACKGROUND

1. Field

One or more embodiments of the present invention relate to an array speaker system and a method for implementing the same, and more particularly, to an array speaker system and a method for implementing the same, the system and method providing a personal sound zone for transmitting concentrated sound to a user without distortion of sound quality by canceling non-uniform radiation patterns.

2. Description of the Related Art

Array speakers are used to adjust the direction of sound to be reproduced by combining a plurality of speakers or to transmit sound to a specific zone. In order to adjust sound at a desired location or in a desired direction, an array including a plurality of sound source signals is needed. According to the principle for transmitting sound generally referred to as directivity, the plurality of sound signals are overlapped using a phase difference between the plurality of sound source signals so that intensities of the sound source signals are increased in a predetermined direction and the sound source signals are transmitted in the predetermined direction. Thus, such directivity is achieved by adjusting phases of the sound source signals output to a plurality of speakers disposed according to a predetermined location. Sound can be focused at the location of a specific listener using such directivity principle. A region in which a sound field is formed due to focusing is referred to as a personal sound zone.

Hereinafter, a sound source is a source from which sound is radiated and output and is used as the term that means an individual speaker that is an element for an array speaker. A sound field is a virtual region in which sound radiated from the sound source is formed. Hereinafter, sound field will be used to refer to a region affected by sound energy. In addition, the term sound pressure refers to a force of sound energy using the physical quantity of pressure.

When sound source signals are output to an array speaker, interference of sound source signals radiated from each speaker is not sufficient at a location within a predetermined distance from the array speaker so that a non-uniform radiation characteristic occurs. This is because sound radiated from a plurality of speakers does not form a desired sound field due to insufficient interference of radiated separate sound source signals at a short distance away from the array speaker. Such phenomenon is referred to as a near field effect. Further, when a sound field radiated from the array speaker is represented as visual patterns, the near field effect is shown as non-uniform radiation patterns.

SUMMARY

One or more embodiments of the present invention provide an array speaker system in which a problem that, when sound source signals are outputted to speakers of an array speaker, a listener does not properly sense the directivity of sound due to non-uniform radiation patterns inevitably generated at a short distance away from the array speaker is solved and a method for implementing the same.

Additional aspects and/or advantages will be set forth in part in the description which follows and, in part, will be apparent from the description, or may be learned by practice of the invention.

According to an aspect of the present invention, a method for canceling non-uniform radiation patterns is provided. The method includes predicting radiation patterns in an array speaker with respect to input signals; generating cancellation signals with respect to at least one region corresponding to non-uniform radiation patterns of the predicted radiation patterns; synthesizing the input signals and the cancellation signals; and outputting the synthesized signals to the array speaker.

According to an aspect of the present invention, a computer readable recording medium is provided in which a program for executing the method for canceling non-uniform radiation patterns is recorded.

According to an aspect of the present invention, an apparatus for canceling non-uniform radiation patterns is provided. The apparatus includes a radiation pattern predicting unit predicting radiation patterns in an array speaker with respect to input signals; a cancellation signal generating unit generating cancellation signals with respect to at least one region corresponding to non-uniform radiation patterns of the predicted radiation patterns; a signal synthesizing unit synthesizing the input signals and the cancellation signals; and a signal outputting unit outputting the synthesized signals to the array speaker.

BRIEF DESCRIPTION OF THE DRAWINGS

These and/or other aspects and advantages will become apparent and more readily appreciated from the following description of the embodiments, taken in conjunction with the accompanying drawings of which.

DETAILED DESCRIPTION OF EMBODIMENTS

Figure 1:
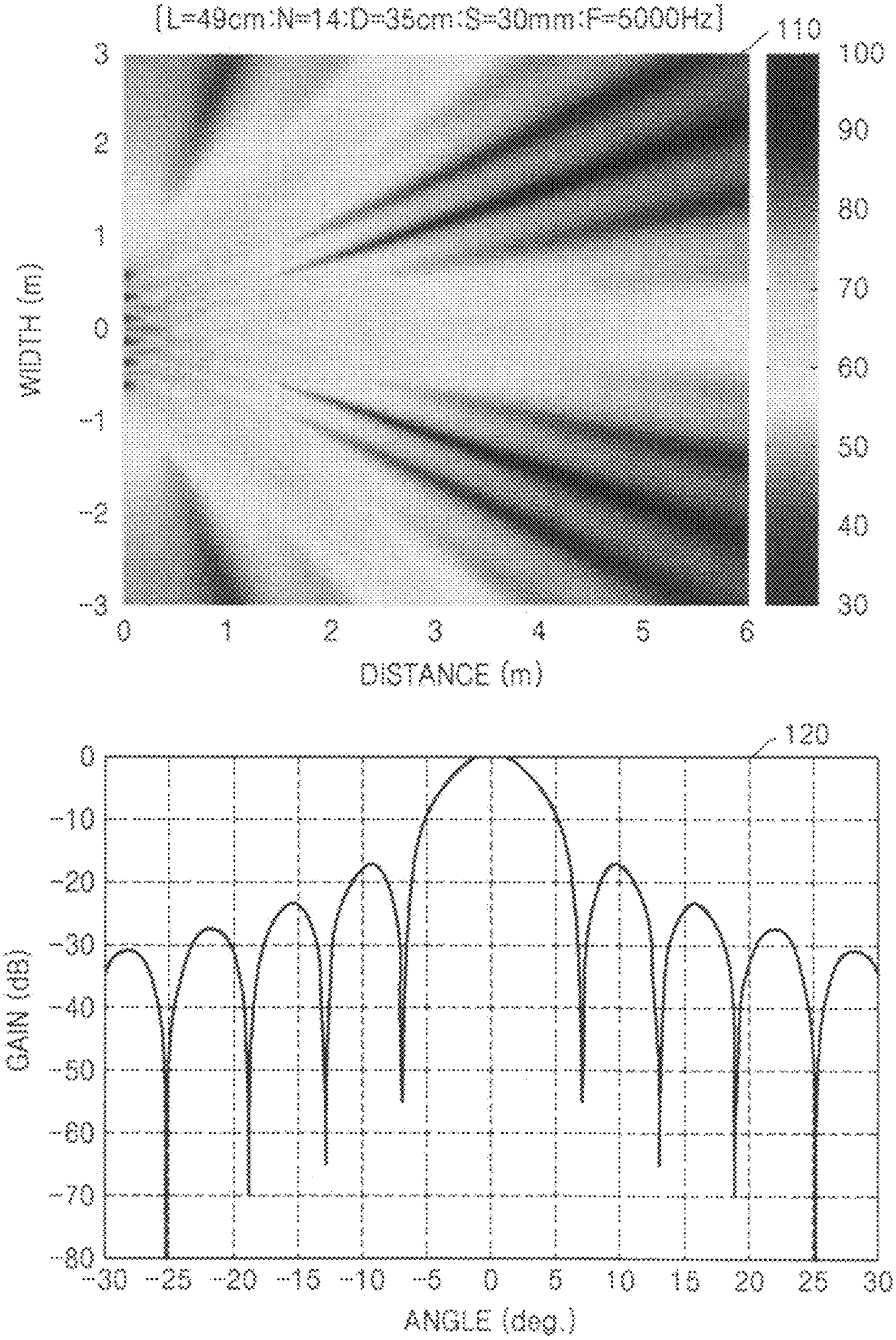
FIG. 1 illustrates non-uniform radiation patterns generated in an array speaker.

Reference will now be made in detail to embodiments, examples of which are illustrated in the accompanying drawings, wherein like reference numerals refer to the like elements throughout. Embodiments are described below to explain the present invention by referring to the figures.

FIG. 1 illustrates non-uniform radiation patterns generated in an array speaker. Here, a sound field radiated from the array speaker is shown as visual patterns and a graph.

A radiation pattern 110 of FIG. 1 represents a change in a radiation characteristic of sound source signals according to the distance of the signals from the array speaker. In the radiation pattern 110, the latitudinal (X) axis represents the distance from the array speaker and the longitudinal (Y) axis represents the distance from the center to an edge of the array speaker. In the radiation pattern 110, it is assumed that the array speaker is positioned at the origin, i.e., a location that corresponds to 0 m of the latitudinal axis and 0 m of the longitudinal axis. As described previously, a near field effect refers to a phenomenon in which sound radiated near to the array speaker is distorted. Such a near field effect can be understood by checking a portion in which non-uniform radiation patterns are generated. In the illustrated radiation pattern 110, non-uniform radiation patterns appear at a distance within the range of about 1 m from the array speaker. If a listener listens to sound nearer to the array speaker than the distance at which non-uniform radiation patterns appear, a radiation characteristic is not uniformly controlled and it will not be easy to listen to reproduced sound.

Reference numeral 120 of FIG. 1 is a graph in which a sound field radiated from the array speaker is represented as a beam pattern. A latitudinal (X) axis of the beam pattern represents a radiation angle of beams centering around the array speaker and a longitudinal (Y) axis of the beam pattern represents a gain value of a sound source. The beam pattern signifies that an electric field strength of electromagnetic waves radiated from a signal output device, such as a speaker and an antenna, is measured and is shown as a graph. The beam pattern is obtained by receiving signals from a speaker measured using an output signal measuring unit and by showing an electric field strength received according to each measurement angle on a graph or polar chart as a waveform. Thus, as distance increases from a control point of the graph, an electric field strength increases and this means that signals have directivity in a corresponding direction.

In the beam pattern 120, small and thin beam patterns appear centering around a middle main lobe. Small and thin beam patterns excluding main lobes having strong directivity are referred to as side lobes and such side lobes appear as non-uniform radiation patterns of the radiation patterns 110. As a result, side lobes or non-uniform radiation patterns cause disturbance of convergence of sound field characteristics such as directivity in a sound apparatus.

In particular, unlike audio devices generally used at home, in small sound devices such as a mobile phone or digital multimedia broadcasting (DMB) players, portable multimedia players (PMP) in which a user views moving pictures while carrying the player, and a notebook PC and a monitor in which a speaker is built, the distance between users from the sound device is short such that the possibility of a near field effect increases. Thus, an array speaker system in which the occurrence of a near field effect is suppressed and sound source signals having added directivity can be properly output is needed, in particular when the distance between the speaker and a user is small.

Figure 2:
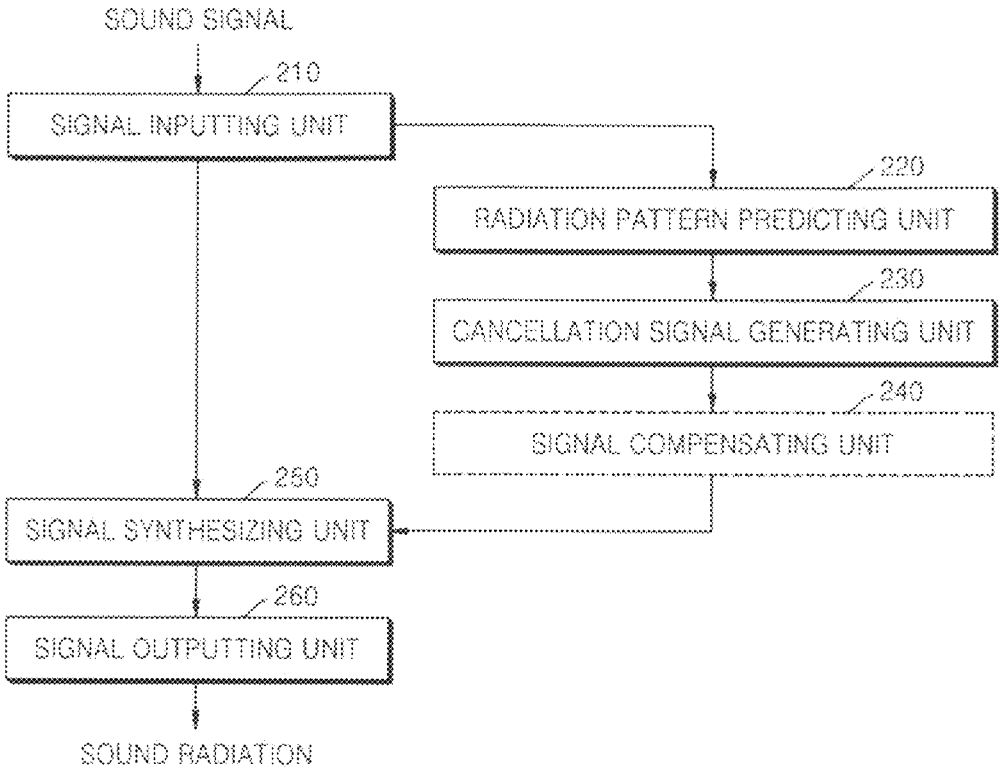
FIG. 2 illustrates an array speaker system for canceling non-uniform radiation patterns, according to an embodiment of the present invention.

FIG. 2 illustrates an array speaker system for canceling non-uniform radiation patterns, according to an embodiment of the present invention. The array speaker system of FIG. 2 includes, for example, a signal inputting unit 210, a radiation pattern predicting unit 220, a cancellation signal generating unit 230, a signal compensating unit 240, a signal synthesizing unit 250 and a signal outputting unit 260.

The signal inputting unit 210 reproduces sound signals input to the array speaker system by the number of separate speakers of an array and performs signal processing such as delaying the reproduced sound signals for a predetermined amount of time so as to implement a sound field, e.g., directivity. More specifically, the signal inputting unit 210 will now be described with reference to FIGS. 3A and 3B.

Figure 3A:
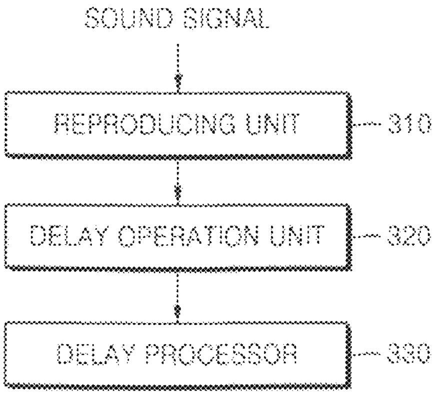
FIG. 3A illustrates a signal inputting unit in the array speaker system of FIG. 2.

FIG. 3A illustrates a signal inputting unit in the array speaker system of FIG. 2. The signal inputting unit 210 includes, for example, a reproducing unit 310, a delay operation unit 320 and a delay processor 330.

The reproducing unit 310 reproduces an input sound-source signal by the number of separate speakers of an array (or the number of channels to be output) and supplies the reproduced sound source signal to the delay operation unit 320.

The delay operation unit 320 determines whether each sound source signal is to be delayed, and at which degrees, for desired purposes such as the direction of sound to be output or the location of focusing in which a sound energy is to be concentrated. The operation may be performed using an additional processor. However, if necessary, the operation may be stored in a specific storage device of the array speaker system in a pre-calculated shape according to output types of sound fields. A delay value of a sound source signal to be processed by the delay operation unit 320, for each channel, is determined using Equation 1 below.

$$\Delta = \left[\left(\frac{2\pi}{\lambda}\right)\cdot d\cdot \sin\theta\right] \quad \text{Equation 1}$$

where Δ is a delay value, λ is a wavelength of a sound signal to be output, d is a distance between separate speakers of an array speaker and θ is an angle formed by the array speaker and the radiation direction of the sound source signal. In other words, the delay operation unit 320 determines delay values for each channel in consideration of various parameters, for example, the physical characteristics of the array speaker such as the distance d between separate speakers, the property of a sound source to be output such as its wavelength λ and an output direction or a focusing location.

The delay processor 330 delays sound source signals reproduced by the reproducing unit 310 according to delay values for each channel calculated by the delay operation unit 320 as above. If delay values for each channel are stored in a pre-calculated shape, specific parameters related to formation of the sound field may be called from the storage device and may be delayed according to separate sound source channels.

Figure 3B:
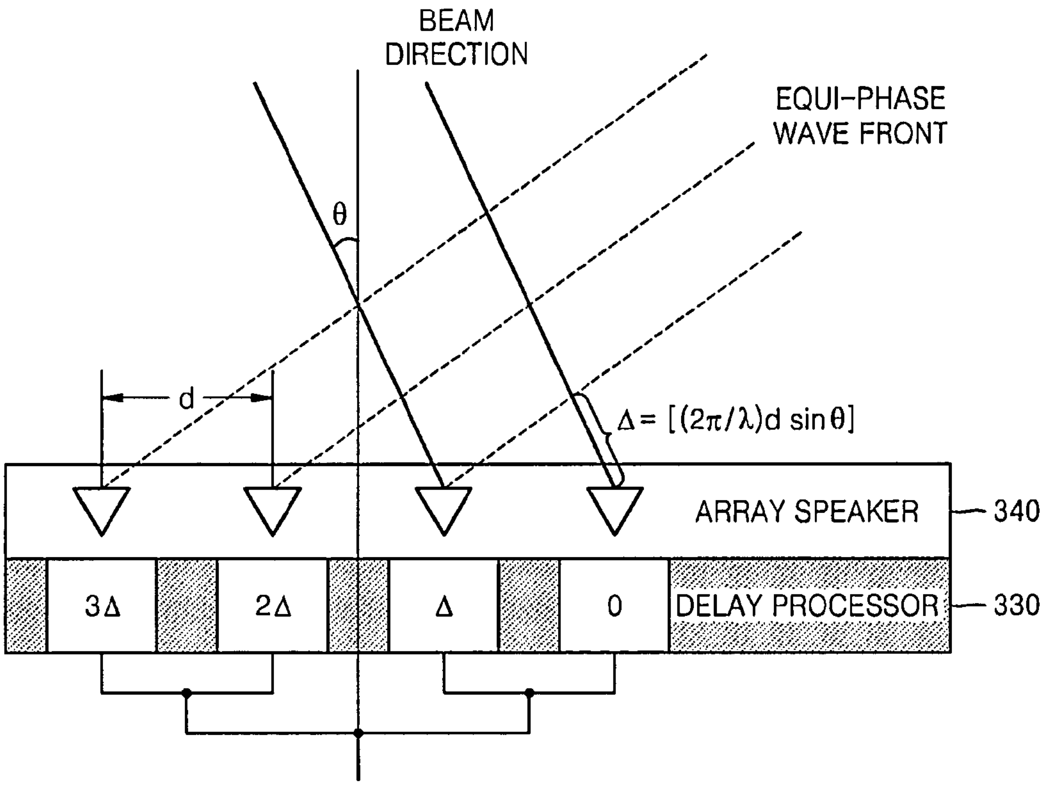
FIG. 3B illustrates an operation of reproducing and delaying input signals using a signal inputting unit in the array speaker system of FIG. 2.

FIG. 3B illustrates an operation of reproducing and delaying input signals using a signal inputting unit in the array speaker system of FIG. 2. In particular, FIG. 3B illustrates an operation of implementing directivity using an array speaker 340 centering around the delay processor 330. In FIG. 3B, it is assumed that the number of channels (or separate speakers) of the array speaker 340 is four. A dotted line of FIG. 3B represents an equi-phase wave front indicating a wave front from which sound source signals having equivalent phase are radiated. A delay operation unit (not shown) calculates delay values for each channel and the delay processor 330 delays each channel by 0, Δ, 2Δ and 3Δ, according to calculated delay values. As a result, the array speaker 340 outputs sound source signals having directivity by θ to the left, as illustrated in FIG. 3B. Here, a delay value Δ for outputting a sound source signal having directivity by θ to the left is calculated using Equation 1.

Referring back to FIG. 2, the radiation pattern predicting unit 220, for predicting radiation patterns of sound source signals processed by the signal inputting unit 210, will be described in greater detail below.

The radiation pattern predicting unit 220 defines a response model related to a sound pressure radiated from the array speaker and predicts radiation patterns from the array speaker through the defined response model. Here, the response model signifies that the relationship ranging from specific input to output is found and is modeled as a standardized expression such as an equation. In the present embodiment, a sound signal output from the array speaker may correspond to an input, and a sound signal at the location distant from the array speaker by a distance may correspond to output. In other words, the response model is an expression in which the correlation related to the case where the sound signal output from the array speaker has which sound pressure at the location distant from the array speaker by a predetermined distance is expresses as a function using physical parameters.

Subsequently, the radiation pattern predicting unit 220 applies input signals input by the signal inputting unit 210 to the defined response model. The input signals may be processed as radiation signals for a predetermined field point according to the definition of the response model. As such, the radiation pattern predicting unit 220 may calculate radiation patterns for input signals.

A procedure for defining the response model using the radiation pattern predicting unit 220 will now be described in greater detail. A theoretical method and an experimental method may be used to obtain the response model related to the sound signals radiated from the array speaker. Each embodiment will now be described sequentially.

First, in the theoretical method, a sound model is constituted using a sound propagation equation between locations distant from the array speaker by a predetermined distance. A sound pressure at the location distant from one sound source by a predetermined distance is defined using Equation 2 below.

Equation 2

$$p(R,\theta)=\frac{\omega\rho_0 e^{-jkr_s}}{2\pi r_s}u_z(x_s)dx_s \tag{2}$$

Figure 4:
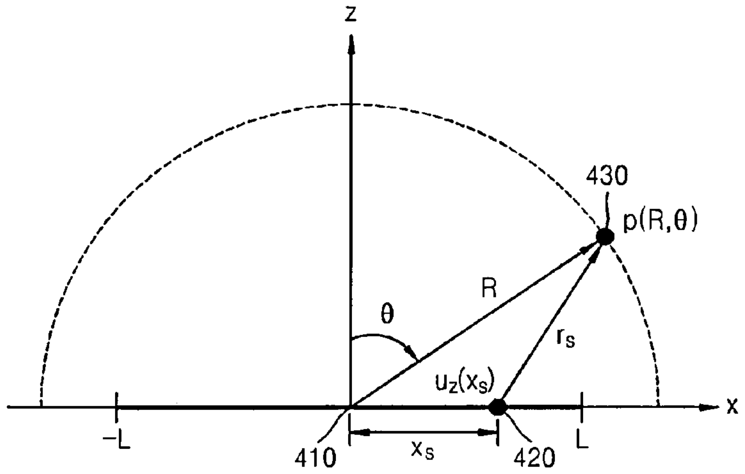
FIG. 4 illustrates an operation of constituting a response model related to a sound pressure in the array speaker system of FIG. 2.

Each of parameters included in Equation 2 will now be described with reference to FIG. 4. FIG. 4 illustrates an operation of constituting a response model related to a sound pressure in the array speaker system of FIG. 2. It is assumed that the center of the array speaker is positioned at an origin 410 in which an x-axis and a y-axis intersect and both ends of the array speaker are positioned at −L and L of the x-axis, respectively. In other words, the size of the entire array will be about 2 L. A speaker which corresponds to an individual sound source is positioned at a location 420 distant from the origin 410 which is the center of the array speaker, by a distance $x_s$. Further, an arbitrary field point 430 is distant from the origin 410 by a distance R and from the location 420 (where the individual sound source is located) by a distance $r_s$.

In Equation 2, R is a distance from the origin 410, which coincides the center of the array speaker, and θ is an angle formed by the array speaker and an arbitrary field point. In addition, ω is an angular velocity, $\rho_0$ is the intensity of the air, κ is a wave number and $U_z(x_s)$ is surface velocity of a sound source. In other words, in Equation 2, the relationship in which an angle θ is formed between the array speaker and the field point 430 between the location of one source positioned at the location 420 distant from the origin 410 by the distance $x_s$ and the location distance from the origin 410 of the array speaker by the distance R, is expressed as a sound pressure.

If the sound pressure related to one field point is defined from one sound source of the array speaker using Equation 2, the sound pressure related to one field point is defined using a plurality of sound sources using Equation 3 below.

Equation 3

$$\begin{aligned}p(R,\theta)&=\int_{-L}^{L}\frac{\omega\rho_o e^{-jkr_s}}{2\pi r_s}u_z(x_s)dx_s\\&\approx\sum\frac{\omega\rho_o e^{-jkr_s}}{2\pi r_s}u_z(x_s)d_s\end{aligned}$$

Equation 3 is the integral of Equation 2 with respect to the size of the array speaker. In FIG. 4, it is assumed that the displacement of both sides of the array speaker are defined as −L and L. Thus, Equation 3 is also integral calculus of equation 2 from −L to L. Thus, the response model between a plurality of sound sources of the array speaker and one field point is defined using Equation 3. As described above, the response model related to a sound signal radiated from the array speaker is obtained using the theoretical method. In other words, the sound pressure of the sound source radiated from the array speaker may be obtained by inputting the sound source to be applied to the array speaker to the response model, and a graph or radiation pattern may be obtained by making a gain or sound field according to the angle from the array speaker in a specific space in which a sound field of the sound source affects, as a numerical value.

Secondly, an operation of obtaining the response model using the experimental method will now be described.

The experimental method is fundamentally the same as the theoretical method in that the response model is defined based on the relationship between the array speaker and an arbitrary field point.

In the experimental method, firstly, a predetermined sound source signal is applied to an individual speaker of the array speaker and is output to a corresponding speaker. Here, the predetermined sound source signal is a test sound source used to measure a radiated sound source signal. The predetermined sound source signal may be an impulse signal or white noise in which all frequency components are uniformly included. The predetermined sound source output to one speaker is measured at a location (which means a field point) separated from the array speaker by a predetermined distance. A measuring device such as a microphone array may be used to measure the sound source signal. Subsequently, the above measurement procedure is repeatedly performed in a plurality of speakers of the array speaker so that the response model related to the sound pressure of the entire array speaker can be defined based on measured signals.

Two embodiments in which the response model for the sound signal radiated from the array speaker is defined using the radiation pattern predicting unit 220 of FIG. 2 have been described above. If radiation patterns of the array speaker are calculated based on the response model defined in this way, as previously described, the location with the radiation pattern at which non-uniform radiation patterns appear can be determined. To this end, the region within predicted radiation patterns in which non-uniform radiation patterns are generated may be manually determined by a user or may be determined automatically by a change in signal strength, such as gain of generated radiation patterns. If the region in which non-uniform radiation patterns are generated is determined by the user, a corresponding region may be specified as an object to be cancelled.

Cancellation signals may be signals having a phase inverse to non-uniform radiation patterns so as to cancel the non-uniform radiation patterns. However, the cancellation signal need not have inverse phase, i.e., phase opposite to that of the non-uniform radiation patterns. This is because a plurality of side lobes may be generated in a region within the radiation patterns of the array speaker (i.e., a region in which the non-uniform radiation patterns are generated) and all of the side lobes need not be cancelled.

As the phenomenon that a plurality of side lobes are generated has been described in the beam pattern 120 of FIG. 1, the size of the side lobes may vary, and the side lobes need not be cancelled if they are not side lobes that cause hindrance when a listener listens to a sound field. Thus, the cancellation signal generating unit 230 may also generate cancellation signals selectively only in part of regions in which non-uniform radiation patterns are recognized. Furthermore, even for side lobes that are to be cancelled, the side lobes only need be cancelled to the degree that the side lobes cause severe distortion of sound. Thus, the cancellation signals need not be coincident with the inverse phase of non-uniform radiation patterns.

As described above, the cancellation signal generating unit 230 generates cancellation signals in a region in which non-uniform radiation patterns are recognized. To this end, the cancellation signal generating unit 230 selects an object to be cancelled from a plurality of regions in which non-uniform radiation patterns are generated. In other words, the direction of non-uniform radiation patterns is set so that target signals to be cancelled are defined. Here, the direction in which non-uniform radiation patterns appear on the right and left of a direction perpendicular to the array speaker is referred to as an interference angle. The interference angle may be set by recognizing a portion in which the intensity of a sound source signal (which means a gain of the sound source signal) is partially and greatly increased and reduced in other regions excluding main lobes from predicted radiation patterns, as side lobes.

Figure 5:
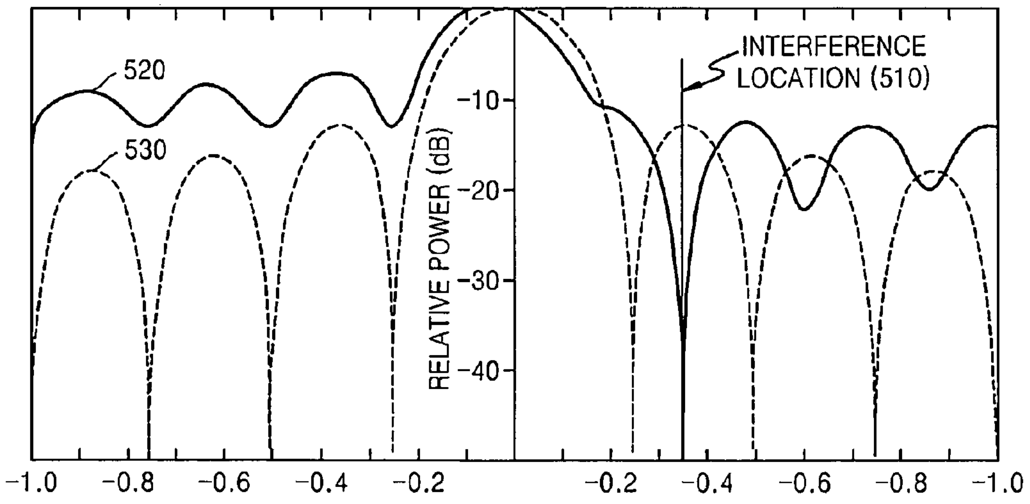
FIG. 5 illustrates an operation of defining target signals according to interference angles in the array speaker system of FIG. 2.

FIG. 5 illustrates an operation of defining target signals according to interference angles in the array speaker system of FIG. 2. A dotted line 530 of FIG. 5 represents radiation patterns of the array speaker predicted by a radiation pattern predicting unit (not shown). An interference angle 510 is set with respect to one region in which non-uniform radiation patterns, of the radiation patterns predicted by a cancellation signal generating unit (not shown), are recognized. The cancellation signal generating unit (not shown) generates cancellation signals based on the set interference angle 510. The cancellation signals are shown as a solid line 520 in FIG. 5. Cancellation signals (solid line) having an inverse phase with respect to non-uniform radiation patterns shown as the dotted line 530 are generated at the set interference angle 510. In FIG. 5, only one interference angel 510 is shown. However, a plurality of interference angles may be defined to generate cancellation signals, according to various embodiments and actual implementation environment of the present invention. Hereinafter, an operation of generating cancellation signals using a cancellation signal generating unit (not shown) will be described in greater detail.

Figure 6:
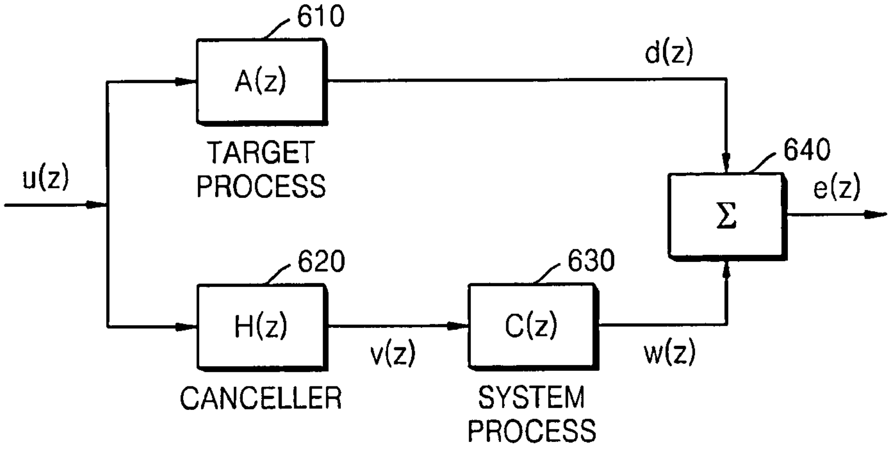
FIG. 6 illustrates an operation of generating cancellation signals in the array speaker system of FIG. 2.

FIG. 6 illustrates an operation of generating cancellation signals in the array speaker system of FIG. 2. As an example of the method, FIG. 6 illustrates an open-loop feed-forward method.

The open-loop feed-forward method is known in the field of signal processing as one method for controlling an element having an arbitrary displacement value using the relationship between a plurality of elements of a system. Here, control means that the state of a physical quantity is in the state where a control subject is suitable for a desired purpose. In other words, control, in an embodiment of the present invention, means that a signal processing system adjusts parameters of a predetermined configuration (a cancellation signal generating unit) of the signal processing system so that the signal processing system can output results that a manager or a user wants. In addition, a closed loop in which measurement and execution are repeatedly performed is not formed in a series of procedures for configuring a system, and an open type feed-forward method by which the measured results are changed by detecting a control value (not a feedback method by which a control value is corrected from the measured results) is used in the series of procedures. The detailed operating principle of the open type feed-forward method will be easily understood by one of ordinary skill in the art to which the present invention pertains.

The cancellation signal generating unit of FIG. 6 is a control system for determining a control value for generating cancellation signals. The cancellation signal generating unit includes, for example, a target process 610, a canceller 620, a system process 630 and a subtractor 640. Here, the control value is a transfer function H(z) which indicates the relationship between an input signal and an output signal of the canceller 620. The control value is obtained by determining filter coefficients of the canceller 620.

The target process 610 indicates the characteristic of non-uniform radiation patterns to be cancelled and generates non-uniform radiation patterns corresponding to an interference angle that is set by received sound source signals. In other words, the sound source signals are processed as target signals to be cancelled through the target process 610.

The canceller 620 receives the same sound source signals as those input to the target process 610, processes them using a signal processing filter such as a finite impulse response (FIR) filter and inputs the processed signals to the next system process 630, so as to generate cancellation signals used to cancel non-uniform radiation patterns corresponding to the set interference angle. Here, the filter of the canceller 620 is properly controlled through predication so that a difference between target signals to be cancelled and cancellation signals is minimum. The filter is controlled by an open type feed-forward method and its detailed description will be omitted.

The system process 630 indicates the intrinsic array characteristic of the system and generates sound source signals radiated from the array speaker using a predicted response model. In other words, input signals are processed as cancellation signals using the canceller 620 and the system process 630. Last, the subtracter 640 subtracts the target signals generated through the target process 610 and the cancellation signals generated using the canceller 620 and the system process 630. Since the cancellation signals are generated by predicting the subtracted results from the canceller 620, theoretically, a difference value subtracted by the subtracter 640 will be 0. In other words, the control value H(z) of the canceller 620 is determined as a value for generating cancellation signals.

The above procedure will now be summarized. In the open type feed-forward method of FIG. 6, the sound source signals are received and target signals to be cancelled are generated through the target process 610. Separately, the sound source signals are output as cancellation signals used to cancel the target signals using the canceller 620 and the system process 630. When the target signals and the cancellation signals are subtracted by the subtracter 640, a difference value between the target signals and the cancellation signals is 0 theoretically and the control value H(z) for generating cancellation signals is determined.

In FIG. 6, all processes and parameters are converted from the time domain into a frequency domain z and are calculated for calculation conveniences. Thus, a procedure for determining the control value H(z) is expressed as matrix multiplication using Equation 4 below.

$$d=A\cdot u \qquad \text{Equation 4}$$

In Equation 4, target signals d(z) to be cancelled are expressed, and Equation 4 is expressed as multiplication of input signals u(z) and a target process A(z). This is performed through the target process 610 of FIG. 6.

$$\begin{aligned} w &= C\cdot v \\ &= C\cdot H\cdot u(\because v = H\cdot u) \end{aligned} \qquad \text{Equation 5}$$

In Equation 5, cancellation signals w(z) are expressed. Equation 5 illustrates that the input signals u(z) are output as cancellation signals using the canceller H(z) and the system process C(z). This is performed through the canceller 620 and the system process 630 of FIG. 6. Since error signals e(z) that are obtained by subtracting the target signals d(z) and the cancellation signals w(z) are theoretically 0, signals generated using Equations 4 and 5 are the same. Thus, the following Equation 6 is formed.

$$A\cdot u=C\cdot H\cdot u$$

$$A=C\cdot H \qquad \text{Equation 6}$$

In addition, if an inverse matrix of the system process C(z) is multiplied by both members of Equation 6, the following Equation 7 is formed.

$$\begin{aligned} C^{-1}\cdot A &= C^{-1}\cdot C\cdot H \\ &= H \end{aligned} \qquad \text{Equation 7}$$

The control value H to be consequently obtained is determined as $C^{-1}\cdot A$. Here, C may be obtained from a response model between separate speakers of the array speaker and a field point, and A may be obtained by defining target signals to be cancelled at an interference angle using the response model. Under ideal conditions in which a matrix C(z) has square and non-singular characteristics, the control value H(z) of the canceller 620 is defined using Equation 8 as follows.

$$H_o=H_I A$$

$$(o\text{:optimal}, H_I=C^{-1}) \qquad \text{Equation 8}$$

However, in an actual implementation environment, the target signals d(z) and the cancellation signals w(z) are not the same, and in most cases, a difference value (error) e(z) is not 0. Thus, in order to minimize errors, the difference value is defined as a quadratic cost function and H(z), in which its error is minimized, is determined. The difference value is obtained using the subtracter 640 of FIG. 6 and the procedure is defined using Equation 9 below.

$$e=d-w$$

$$\min J=\|e\|^2 \qquad \text{Equation 9}$$

If H(z) is obtained using the method, two designs shown in Equation 10 below are obtained according to the sizes of matrices.

Equation 10:

(1) Overdetermined Case:

$$\text{Rank}(C)=R\&R>SH_1=(C^H\cdot C)^{-1}\cdot C^H$$

(2) Underdetermined Case:

$$\text{Rank}(C)=S\&R<SH_I=C^H\cdot(C\cdot C^H)^{-1}$$

In the first case of Equation 10, when the number of polynomials is greater than the number of unknown numbers so as to obtain Equation 9 (overdetermined case), a pseudo-inverse matrix of the system process C(z) is obtained. In the second case of Equation 10, when the number of polynomials is smaller than the number of unknown numbers so as to obtain Equation 9 (underdetermined case), a pseudo-inverse matrix of the system process C(z) is obtained. Here, $C^H$ means a Hermitian transpose.

The operation of determining the control value H(z) of the cancellation signal generating unit has been described above. The control value may be calculated in real-time using the array speaker system, according to embodiments of the present invention, but may also be determined off-line through the calculation procedure and then may be stored in a predetermined storage device. When the control value is previously calculated and is stored in the storage device, the cancellation signal generating unit reads the stored control value and adjusts the filter of the canceller to generate cancellation signals. In particular, when types of sound fields to be radiated are previously determined in the array speaker system, various control values may be calculated according to the types and may be previously stored and called according to the request of the user or the array speaker system.

Referring back to FIG. 2, the cancellation signal generating unit 230 generates cancellation signals to be supplied to separate speakers of the array speaker using convolution of original signals input by the signal inputting unit 210 and a determined control value (which means a coefficient of a cancellation filter). The generated cancellation signals may have a phase that is inverse with respect to a region corresponding to non-uniform radiation patterns of radiation patterns of the input signals applied to the signal inputting unit 210.

The signal compensating unit 240 adjusts gains of a zone, which does not correspond to an interference angle of the cancellation signals generated by the cancellation signal generating unit 230. This is because the sound source signals input by the signal inputting unit 210 and the cancellation signals generated by the cancellation signal generating unit 230 are synthesized by the signal synthesizing unit 250 that will be described later and in this procedure, non-uniform radiation patterns corresponding to the interference angle may be cancelled and signals such as main lobes not to be cancelled may be changed. For example, when the cancellation signals are synthesized with the original sound source signals, in a region excluding a region in which the non-uniform radiation patterns appear, the sound pressure of the signals may be increased. In addition, since the response model is defined by the radiation pattern predicting unit 220 using a theoretical method or without precisely considering the characteristic of the array speaker, gain values of the cancellation signals generated by the cancellation signal generating unit 230 may need to be adjusted. Thus, the signal compensating unit 240 reduces gains of signals not to be cancelled to a proper size from the cancellation signals or performs compensation for reflecting the characteristic of the array speaker.

The signal synthesizing unit 250 generates the sound source signals reproduced by the number of channels of the array speaker using the signal inputting unit 210, and the cancellation signals generated by the cancellation signal generating unit 230. As such, the signal synthesizing unit 250 outputs sound source signals from which non-uniform radiation patterns corresponding to the interference angel determined by the cancellation signal generating unit 230 are cancelled. Last, the signal outputting unit 260 outputs the sound source signals synthesized by the signal synthesizing unit 250 to the array speaker. The signal synthesizing procedure may be performed in various combinations by the number of separate speakers of the array speaker, the number of channels for outputting sound source signals or according to the shapes of non-uniform radiation patterns, and may be implemented in various embodiments.

Figure 7A:
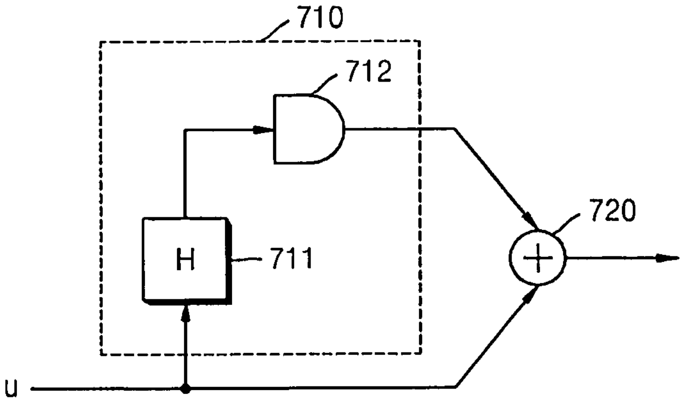
FIG. 7A illustrates an array speaker system further comprising a signal compensating unit according, to another embodiment of the present invention.

FIG. 7A illustrates an array speaker system further comprising a signal compensating unit, according to another embodiment of the present invention. The signal compensating unit includes, for example, a cancellation signal generator 710 and a synthesizer 720. The cancellation signal generator 710 includes, for example, a canceller 711, a signal compensator 712. As described with reference to FIGS. 2 and 6, the canceller 711 generates cancellation signals according to a determined control value, that is, a filter coefficient H(z), and adjusts gain values of the generated cancellation signals using the signal compensator 712. The synthesizer 720 synthesizes the compensated cancellation signals and sound source signals u, input by a signal inputting unit (not shown), so that sound source signals from which non-uniform radiation patterns are cancelled at the interference angle are output.

Figure 7B:
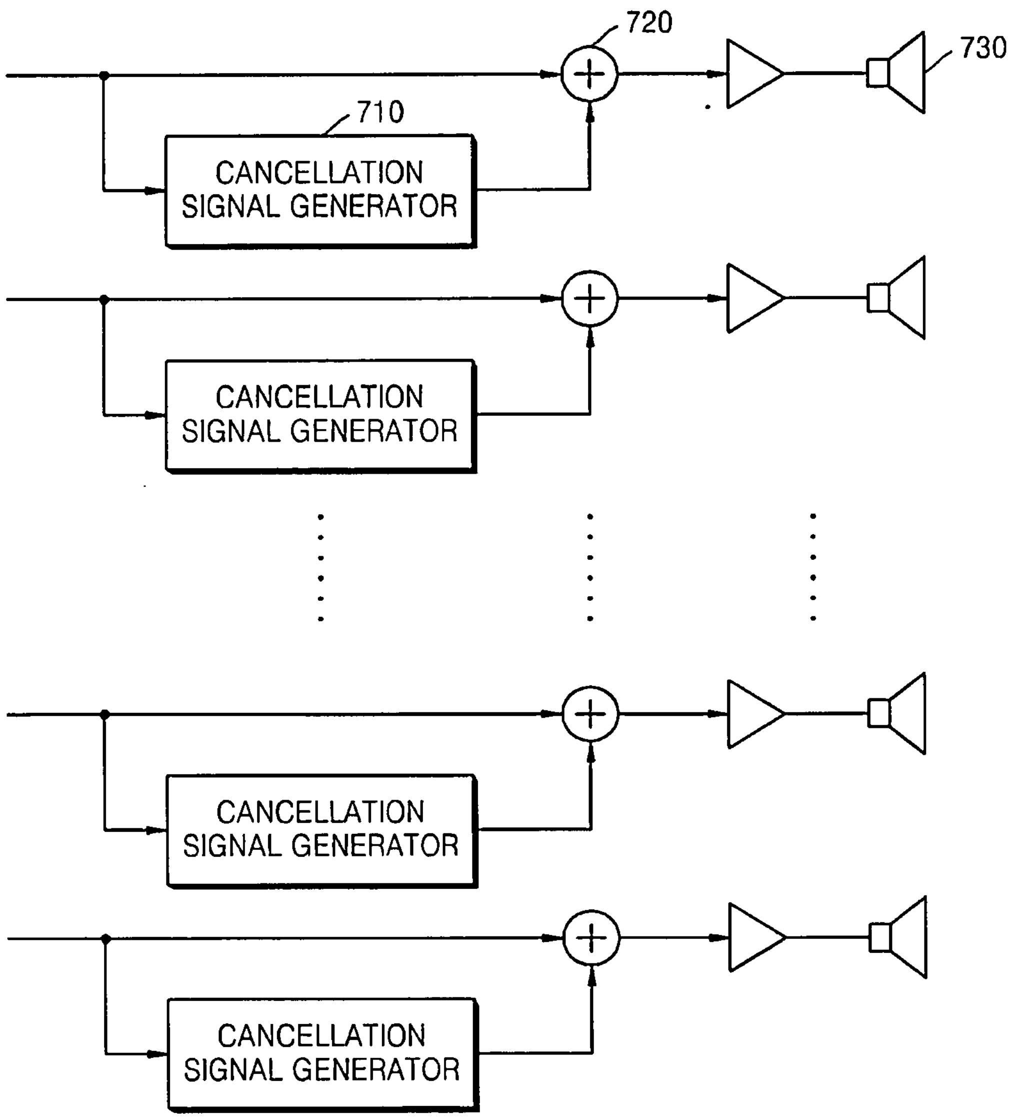
FIG. 7B illustrates an operation of connecting a cancellation signal generating unit and a signal synthesizing unit with respect to a plurality of channels in an array speaker system, according to an embodiment of the present invention.

FIG. 7B illustrates an operation of connecting a cancellation signal generating unit and a signal synthesizing unit, with respect to a plurality of channels in an array speaker system, according to another embodiment of the present invention. Similar to FIG. 7A, signals input by a signal inputting unit (not shown) are synthesized by the synthesizer 720 together with cancellation signals generated by the cancellation signal generator 710. As a result of synthesis, sound source signals from which non-uniform radiation patterns are cancelled are output to an individual speaker 730, of the array speaker. As illustrated in FIG. 7B, the quantity of cancellation signal generators and synthesizers that may be included may be the same as the number of speakers of the array speaker, and each cancellation signal generator may operate optionally. For example, when non-uniform radiation patterns are generated only with respect to part of input signals applied to the plurality of speakers, cancellation signals may be generated only in corresponding sound source signals and synthesized. In other words, the operation of the cancellation signal generator may be determined depending on the number of interference angles described in FIG. 5.

Figure 7C:
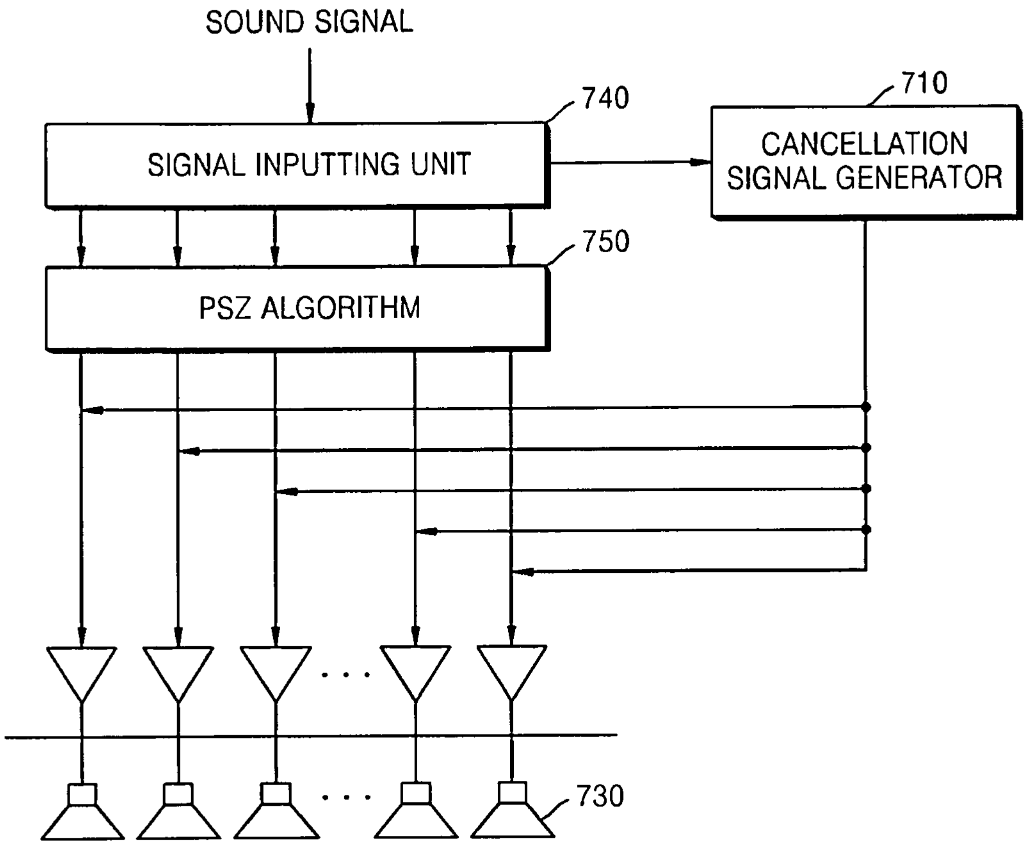
FIG. 7C illustrates the entire configuration in which non-uniform radiation patterns are cancelled and a personal sound zone is implemented in an array speaker system, according to another embodiment of the present invention.

FIG. 7C illustrates an entire configuration in which non-uniform radiation patterns are cancelled and a personal sound zone is implemented in an array speaker system, according to another embodiment of the present invention. A signal inputting unit 740 reproduces input sound source signals by the number of separate speakers of an array speaker 730. A signal processor 750 performs signal processing, such as adjusting directivity of the sound source signals according to a personal sound zone algorithm or focusing sound to a predetermined location of a listener. A cancellation signal generator 710 receives sound source signals from the signal inputting unit 740, generates cancellation signals used to cancel non-uniform radiation patterns, and synthesizes the generated cancellation signals with the sound source signals output by the signal processor 750. The synthesis operation is performed according to channels to correspond to each of separate speakers of the array speaker. Last, the array speaker 730 outputs the synthesized sound signals.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. A method for canceling non-uniform radiation patterns, the method comprising:
- predicting radiation patterns with respect to input signals to be input to an array speaker comprising a plurality of linearly arranged sound sources;
- generating cancellation signals with respect to at least one region corresponding to non-uniform radiation patterns of the predicted radiation patterns;
- synthesizing the input signals with the cancellation signals; and
- outputting the synthesized signals to the array speaker.

2. The method of claim 1, wherein the generating of the cancellation signals comprises:
- defining signals corresponding to at least one region corresponding to the non-uniform radiation patterns as target signals;
- adjusting a coefficient of a cancellation filter so as to cancel the defined target signals; and
- filtering the input signals according to the coefficient of the adjusted cancellation filter.

3. The method of claim 2, further comprising previously calculating and storing the coefficient of the cancellation filter, wherein the filtering of the input signals comprises reading the stored coefficient and filtering the input signals according to the read coefficient.

4. The method of claim 2, wherein the coefficient of the cancellation filter is a value in which a difference between signals obtained by filtering the input signals using the cancellation filter and the defined target signals is minimized.

5. The method of claim 1, wherein the predicting of the radiation patterns comprises:
- defining a response model related to a sound pressure of the array speaker; and
- inputting the input signals to the defined response model and calculating the radiation patterns.

6. The method of claim 5, wherein the defining of the response model comprises defining the response model related to the sound pressure of the array speaker using a predetermined sound propagation relationship between the array speaker and a location distant from the array speaker by a predetermined distance.

7. The method of claim 5, wherein the defining of the response model comprises measuring predetermined signals outputted from one speaker of the array speaker at a location distant from the array speaker by a predetermined distance, wherein the measuring of the predetermined signals is performed repeatedly in a plurality of speakers of the array speaker so that the response model related to the sound pressure of the array speaker is defined based on obtained signals.

8. The method of claim 1, wherein the generating of the cancellation signals is performed optionally with respect to at least one channel of the region and the synthesizing of the input signals and the cancellation signals is performed in response to the optionally-generated cancellation signals.

9. The method of claim 1, further comprising compensating at least one of gain and directivity characteristics with respect to the generated cancellation signals.

10. A non-transitory computer readable recording medium in which a program for executing the method of claim 1 is recorded.

11. The apparatus of claim 1, wherein the cancellation signal generating unit comprises:

a target signal defining unit defining signals corresponding to at least one region corresponding to the non-uniform radiation patterns as target signals;

a filter coefficient adjusting unit adjusting a coefficient of a cancellation filter so as to cancel the defined target signals; and a cancellation filter filtering the input signals according to the coefficient of the adjusted cancellation filter.

12. The apparatus of claim 11, further comprising a storage unit previously calculating and storing the coefficient of the cancellation filter, wherein the cancellation filter reads the stored coefficient and filtering the input signals according to the read coefficient.

13. The apparatus of claim 11, wherein the coefficient of the cancellation filter is a value in which a difference between signals obtained by filtering the input signals using the cancellation filter and the defined target signals is minimized.

14. An apparatus for canceling non-uniform radiation patterns, the apparatus comprising:

a radiation pattern predicting unit predicting radiation patterns with respect to input signals to be input to an array speaker comprising a plurality of linearly arranged sound sources;

a cancellation signal generating unit generating cancellation signals with respect to at least one region corresponding to non-uniform radiation patterns of the predicted radiation patterns;

a signal synthesizing unit synthesizing the input signals with the cancellation signals; and a signal outputting unit outputting the synthesized signals to the array speaker.

15. The apparatus of claim 14, wherein the radiation pattern predicting unit comprises:

a response model defining unit defining a response model related to a sound pressure of the array speaker; and a radiation pattern calculating unit inputting the input signals to the defined response model and calculating the radiation patterns.

16. The apparatus of claim 15, wherein the response model defining unit defines the response model related to the sound pressure of the array speaker using a predetermined sound propagation relationship between the array speaker and a location distant from the array speaker by a predetermined distance.

17. The apparatus of claim 15, wherein the response model defining unit comprises a measuring unit measuring predetermined signals outputted from one speaker of the array speaker at a location distant from the array speaker by a predetermined distance, wherein the measuring of the predetermined signals is performed repeatedly in a plurality of speakers of the array speaker and the response model related to the sound pressure of the array speaker is defined based on obtained signals.

18. The apparatus of claim 14, wherein the cancellation signal generating unit generates the cancellation signals optionally with respect to at least one channel of the region and the signal synthesizing unit synthesizes the input signals and the cancellation signals in response to the optionally-generated cancellation signals.

19. The apparatus of claim 14, further comprising a signal compensating unit compensating at least one of gain and directivity characteristics with respect to the generated cancellation signals.

20. A method for canceling non-uniform radiation patterns, the method comprising:

predicting radiation patterns with respect to input signals to be input to an array speaker comprising a plurality of linearly arranged sound sources;

generating cancellation signals with respect to at least one region corresponding to non-uniform radiation patterns of the predicted radiation patterns, wherein the non-uniform radiation patterns are related to a near-field effect due to insufficient interference of signals radiated from each of the sound sources;

synthesizing the input signals with the cancellation signals; and outputting the synthesized signals to the array speaker.

* * * * *